Dec. 28, 1965　　　J. R. LA VIETES　　　3,226,196
METHOD OF TESTING URINE FOR PREGNANCY
Filed Nov. 22, 1961
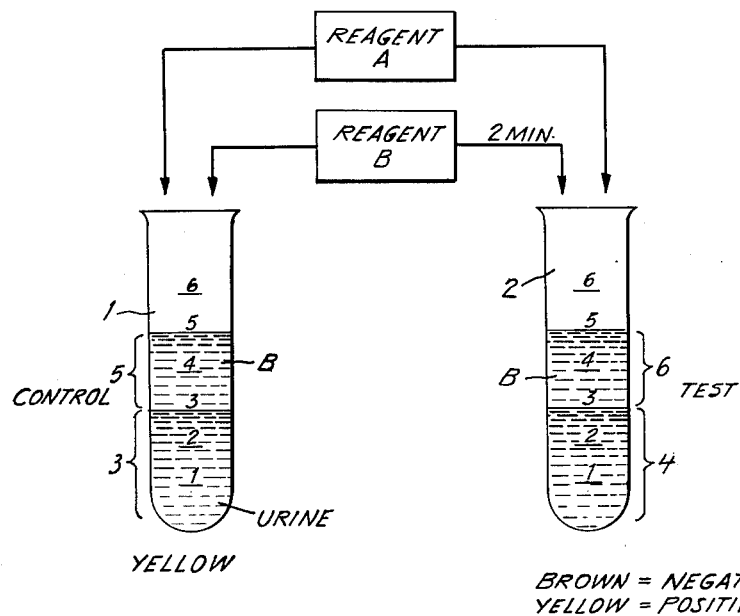
INVENTOR.
JOSEPH R. LA VIETES.
BY
ATTORNEYS United States Patent Office 3,226,196
Patented Dec. 28, 1965

3,226,196
METHOD OF TESTING URINE FOR PREGNANCY
Joseph R. La Vietes, 518 Beach 139th St.,
Belle Harbor, N.Y.
Filed Nov. 22, 1961, Ser. No. 154,121
9 Claims. (Cl. 23—230)

The present invention is directed to the testing of urine and more particularly the urine of women, for the purpose of determining pregnancy.

Heretofore the determination of pregnancy in women was performed on animals. Such tests as the Ascheim-Zondak, Friedman, etc. were performed by injecting urine into such animals as rabbits, mice, rats, frogs. These animals were virgin females and if the ovarian follicles ruptured, the test was deemed positive. These tests require the injection of urine into the bloodstream of the animal, a considerable waiting period, and then an autopsy to see if the ovarian follicles were ruptured. The test is expensive, requires time, and only a skilled technician could perform the test. It often occurs that the urine contains traces of pharmaceuticals, such as aspirin, which are toxic and as a result the test animals may be killed and the determination fails.

There has been proposed a chemical test which has not come into commercial use because of the deficiencies thereof. It involved making the urine alkaline, extracting it with a heavy water-immiscible organic solvent to form two layers, and recovering the aqueous phase. This was then acidified and a solution in ethyl alcohol of 2,4-dinitrophenylhydrazine added. After standing for some time the mixture was made alkaline. The ensuing reaction produced a brown color which faded out. If it faded in two minutes the test showed negative pregnancy and if it did not fade for five minutes the test was positive.

This procedure was unreliable as the fading was gradual and the observer had to interpret the results. The conduct of the test was complicated, requiring a number of manipulative steps, and it required and expert to properly conduct it. The time required was too long for rapid determination and it could not be performed by an unskilled person, such as in the home. The principal reagent was unstable and had to be made up at the time of testing since it deteriorated within 24 hours. Also, the test often gave false positives.

The present invention is intended and adapted to overcome the difficulties and disadvantages inherent in the methods of the prior art, it being among the objects of the invention to provide a chemical test for the above described purpose which is simple to conduct and which is adapted for home use.

It is also among the objects of the invention to devise a method which gives clear and positive results and which is capable of perfectly diagnosing pregnant urine, and without the use of animals.

It is further among the objects of the invention to provide a chemical composition for said test which is stable over a long period of time, and which may be used in the testing to give a positive and comparative result with the use of a control for the comparison.

In practicing the invention there are provided two compositions, usually in aqueous solution but also usable in dry form. The first of the solutions, designated as "Reagent A" is produced as follows:

Concentrated hydrochloric acid (37%-A.C.S.) is added to an excess of dinitrophenylhydrazine forming the acid salt. The mixture is allowed to stand for one hour with occasional shaking. The solution is then diluted to 2.87 normal with distilled water and an excess of methyl red is added. The solution is then shaken for five minutes and then filtered. The filtrate is Reagent A. It is a stable solution, and it has given good results after six months of storage on the laboratory shelf. The methyl red is added as an indicator. The reaction of the urine and Reagent A must take place in an acid medium. An orange color imparted to the urine when Reagent A is added shows that an acid medium has been reached. If the color is still yellow, then more Reagent A must be added until the color of the urine is orange.

The more the amount of the acid salt in Reagent A, the darker are the colors produced when Reagent B is added to the test sample. This factor can be used to decrease or increase the sensitivity of the test. In tests saturated solutions (room temperature—about 25° C.) have been used. If a Reagent A with less of the acid salt is desired, Reagent A is prepared as described under preparation of reagents and various amounts of 2.87 normal HCl added to decrease the amount of the acid salt in the final solution. If a greater amount of the acid salt is desired, a more concentrated solution of the salt is obtained by diluting the Reagent A to a higher normality of HCl than 2.87. A normality such as 10 normal will have a higher concentration of the acid salt present. Reagent B then could be varied or more added to give desired final end results.

The other reagent is a 1-normal aqueous solution of an alkali metal hydroxide such as of sodium or potassium. It may be up in accordance with known procedures. It is here designated as "Reagent B."

In the accompanying drawing constituting a part hereof, there is a diagrammatic showing of the apparatus and the techniques involved in the invention.

There are provided two tubes calibrated in cc.'s, tube 1 being the control tube and tube 2 being the test tube where the determination takes place. Urine, preferably fresh morning urine having a sp. gr. of at least 1.016 at 25° C., is introduced into tubes 1 and 2 up to the 3 cc. marks 3 and 4, respectively. Into each of the tubes there is added 5 drops of Reagent A so that the color of the urine is orange. If not, sufficient Reagent A is further added until the orange color appears.

Immediately thereafter Reagent B is introduced into tube 1 to fill it to the 5 cc. mark as shown at 5. The tube is shaken to form a homogeneous solution. After a lapse of about 2 minutes Reagent B is added to the 5 cc. mark in tube 2 as shown at 6 and the tube is shaken to form a homogeneous solution. The amounts of Reagents A and B may be varied, the purpose being to have a slight alkalinity after Reagent B is added.

After about 15 minutes the tubes are examined. Tube 1 is yellow in color and constitutes the control. If the color in tube 2 is yellow and only slightly darker than tube 1, the urine is positive and denotes a pregnancy. If the color in tube 2 is brown and in marked contrast to tube 1, the urine is negative.

A time element is involved with the test because non-pregnant urines will give a fading effect when Reagent B is added immediately after Reagent A is added to the urine. The sensitivity of the test can be decreased by increasing the time element between the addition of Reagent A and Reagent B. This is an advantage because it can be used to rule out any false positives that may result in further testing.

The reason tube 1 is used and the Reagent B added immediately after Reagent A is that this tube is used as a control. The brown color fades out and all the ingredients of the tube 2 are present. Therefore if the urine is off color, tube 1 serves as a negative control. Tube 2 is compared to the control tube and if there is a marked contrast the test is negative.

In over 350 tests to date, in many cases positive results were obtained within 5 minutes. Fifteen minutes waiting time for the fade reaction have good results but this time may be altered to a shorter or longer time.

While the exact biochemistry of the test is still obscure, a surmise may be made as to what occurs in this reaction. Oestrin is present in both male and non-pregnant female urine. This reacts with the reagents used in the test to produce a brown color. This is easily demonstrable by adding Reagent B immediately after adding Reagent A to the urine. In non-pregnant urines the brown color will fade within 5–15 minutes to a yellow color. If the urine and Reagent A is allowed to stand for as little time as 2 minutes and then Reagent B is added, there is no fading of the chocolate brown color to yellow.

Pregnant female urines contain a large amount of what is thought to be anterior pituitary sex hormone. When a urine of this type is used in the test, it seems to prevent the reaction of the reagents with oestrin so that a fading takes place within 30 minutes to a yellow color. This is the positive reaction.

In negative reactions, it seems that the oestrin is hydrolyzed by Reagent A. This hydrolysis takes place rapidly (about 2 minutes), and the longer the time between the addition of Reagent B, the darker the chocolate brown color and the longer it will persist (up to about 48 hours).

While the invention has been described setting forth a single specific example, many variations in the details of apparatus and procedure may be made within the scope of the invention. For instance, the tubes shown in the drawing may be replaced by equivalent items, such as stoppered graduates. The Reagent B may be measured prior to introduction into the tubes and the urine may be similarly measured so that the tubes need not be calibrated.

Reagent A can be made up using different normalities other than 2.87 normal described above. A lesser or greater number of drops could be used in the test. The proportion of Reagent B is then varied to give the excess of alkalinity desired. Indicators other than methyl red may be used to show the acidity of the urine when added to Reagent A. The reason for choosing methyl red is that the color of the indicator is yellow in alkaline solution. Other indicators such as methyl orange may be used. If an indicator such as sodium alizarin is used, the negative results will be a brown color while the positive results have a purplish hue. If an indicator such as methyl purple is used, the positives come out a light green color while the negatives come out a dark olive green color. It will be noted that methyl purple is a mixed indicator; i.e. composed of two different indicators so that Reagent A can be prepared with mixed indicators.

In place of the above described method of increasing the concentration of the 2,4-dinitrophenylhydrazine acid salt, the dinitrophenylhydrazine may be dissolved in an acid in which it is more soluble such as acetic acid. Reagent A made as described above may be mixed with varying proportions of acetic acid to give the desired concentration of the acid salt in Reagent A. Other organic acids such as lactic acid may be used. Also substituted derivatives such as trichloracetic acid may be used. These may be mixed with the hydrochloric acid preparation of Reagent A in varying quantities to give the results desired.

Reagent A can be prepared with other mineral acids other than the hydrochloric acid. Such acids as sulfuric, nitric, and phosphoric acids may be used. Reagent A prepared with these various acids may be mixed together in varying proportions to obtain correct results.

A number of indicators other than those specifically described may be used. They have a mid-point or point of color change on the acid side and not greater than about pH 5.

I claim:

1. A method of testing female urine to determine pregnancy which consists essentially of placing said urine in a test container, adding thereto a small amount of dinitrophenylhydrazine, the mixture so formed being acid introducing an indicator in the container adapted to respond by change of color to acidity of urine, allowing the urine to stand for at least about two minutes, then rendering the mixture alkaline by introducing aqueous alkali, and noting the color in the mixture.

2. A method according to claim 1 characterized in that the proportion of said dinitrophenylhydradine is a few drops to about 3 cc. of urine.

3. A method according to claim 1 characterized in that the proportion of alkali is about 2 cc. of 1 normal alkali to 3 cc. of urine.

4. A method according to claim 1 characterized in that the time of noting said color is about 5 to 30 minutes after the introduction of said alkali.

5. A method according to claim 1 characterized in that the indicator is taken from the class consisting of methyl red, methyl orange, methyl purple and sodium alizarin.

6. A method according to claim 1 characterized in that the alkali is an alkali metal hydroxide.

7. A method according to claim 1 characterized in that a control test container is provided, urine is placed therein, said dinitrophenylhydrazine is added, the mixture is rendered alkaline immediately, and the colors in said containers are noted at least five minutes after the mixture is rendered alkaline.

8. A method according to claim 1 characterized in that the dinitrophenylhydrazine is in the form of its salt of addition with an acid.

9. A method according to claim 1 characterized in that said indicator has a mid-point of change of color at a pH not greater than about 5.

References Cited by the Examiner

UNITED STATES PATENTS

| | | |
|---|---|---|
| 2,587,221 | 2/1952 | Richardson et al. |
| 2,608,533 | 8/1952 | Carson et al. |
| 2,824,842 | 2/1958 | Sulkowitch et al. |

MORRIS O. WOLK, *Primary Examiner.*

ANTHONY SCIAMANNA, *Examiner.*

Z. PAROCZAY, *Assistant Examiner.*